(12) United States Patent
McGary et al.

(10) Patent No.: US 8,482,251 B2
(45) Date of Patent: Jul. 9, 2013

(54) CHARGER DEVICE

(75) Inventors: Vance M. McGary, Miami, FL (US);
Jean-Phillippe J. Cantave, Boca Raton, FL (US); Lorenzo J. Cruger, Coral Springs, FL (US); LanTing L. Garra, Sunrise, FL (US); Wayne M. Phang, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 800 days.

(21) Appl. No.: 12/627,754

(22) Filed: Nov. 30, 2009

(65) Prior Publication Data

US 2011/0127959 A1    Jun. 2, 2011

(51) Int. Cl.
*H02J 7/00* (2006.01)
*H02J 7/02* (2006.01)

(52) U.S. Cl.
USPC ........... 320/114; 320/107; 320/111; 320/112; 320/113; 320/115

(58) Field of Classification Search
CPC ...................................... Y02E 60/12
USPC ....................................... 320/114
See application file for complete search history.

(56) References Cited

U.S. PATENT DOCUMENTS

| | | | |
|---|---|---|---|
| 3,783,364 A * | 1/1974 | Gallanis et al. | 320/115 |
| 5,592,064 A | 1/1997 | Morita | |
| 5,686,808 A | 11/1997 | Lutz | |
| 5,689,171 A | 11/1997 | Ludewig | |
| 6,337,558 B1 | 1/2002 | Yuen et al. | |
| 6,583,600 B2 | 6/2003 | Haga et al. | |
| 6,765,366 B2 * | 7/2004 | Maggert et al. | 320/114 |
| 7,026,789 B2 * | 4/2006 | Bozzone et al. | 320/108 |
| 7,163,181 B2 | 1/2007 | Omps | |
| 7,469,869 B2 | 12/2008 | Killion | |

OTHER PUBLICATIONS

"The MagSafe Power Adapter on a MacBook"—Retrieved from "http://en.wikipedia.org/wiki/MagSafe"—Jan. 2006—4 pages.

* cited by examiner

*Primary Examiner* — Edward Tso
*Assistant Examiner* — Ahmed Omar
(74) *Attorney, Agent, or Firm* — Barbara R. Doutre; Daniel R. Bestor

(57) ABSTRACT

A charger provides a user selectable interface which allows a battery operated portable communication device to be charged in either face-up or face-down positions. Both single-unit charger and multi-unit charger embodiments are provided. A dual contact scheme allows for the user to select either the face-up or face-down configuration. The face-down configuration accommodates battery powered portable communication devices having accessories as well as radio back housings of varying thickness. Additional storage bins are configured within the charging systems to further improve organization of multiple accessories. Magnetic coupling is also provided to facilitate organization of two or more single-unit chargers.

19 Claims, 5 Drawing Sheets

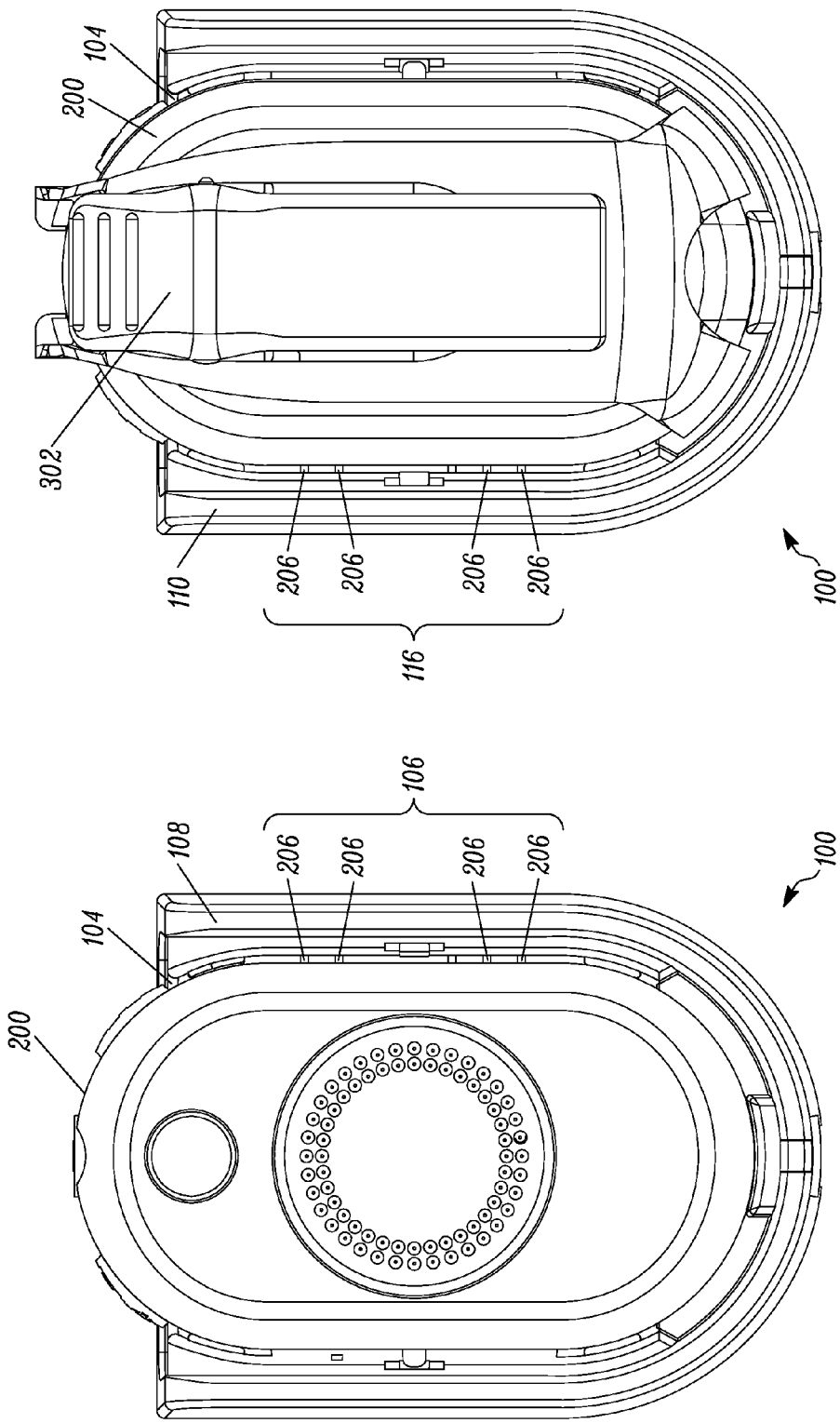

CHARGER DEVICE

FIELD OF THE DISCLOSURE

The present disclosure relates generally to chargers for battery operated communication devices and more particularly to facilitating the user interface of a battery charger.

BACKGROUND

Portable communication devices powered from rechargeable batty packs utilize chargers for charging and recharging the batteries. A single portable communication device may accommodate battery packs of varying thicknesses with the variation in thickness typically being based on battery capacity or chemistry. A drop-in charger can accommodate a battery pack alone or a battery pack coupled to a portable communication device. However, accommodating the complete battery powered portable communication device presents additional design challenges for both single-unit and multi-unit chargers. Alignment and retention issues can make designing the charger interface difficult.

Accessories and attachment cords present yet another problem to the charger interface environment. Accessories typically have to be removed when a battery powered portable communication device is being charged. Accessory cords and the accessories themselves tend to get tangled up in a multi-unit charger environment. Users can become frustrated when attempting to withdraw their own communication device from a multi-unit charger.

Even in the single-unit charger environment, maintaining more than one single-unit charger in a common workspace can be problematic in terms of clutter and organization. In some cases, it is not feasible or advantageous for a consumer to purchase a multi-unit charging system that typically charges six or more radios.

Accordingly, there exists a need for a charger device which provides an improved user interface for a battery powered portable communication device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is the charger of FIG. 1 with a battery powered portable communication device inserted therein in a face-up and face-up position in accordance with some embodiments.

FIG. 3 is the charger of FIG. 1 with the battery powered portable communication device inserted therein in a face-down position in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to providing an improved battery charger interface for a battery operated portable communication device. The present disclosure is directed towards providing a charger that allows a portable communication device to be placed face up or face down while maintaining proper alignment thereby providing flexibility to the end user. When the unit is placed face down, the charger interface can further accommodate a variety of different battery thicknesses without having to remove accessories or attachments.

Briefly, a drop-in charger provides a charger interface which utilizes two sets of symmetrically opposed charger contacts within a charger pocket. The contacts are designed to provide the electrical contact between the charger and the communication device within the drop-in charger. With the contacts symmetrically opposed, the device can be placed in the charger face down allowing for variations in the battery thicknesses and permitting the device to be charged without requiring the removal of accessories or attachments. Because the accessories and attachments can now remain with the device, a separate storage bin is included within the battery charger to manage accessories and attachments, such as a headset. Additionally, individual chargers can now be stacked together via magnetic coupling to further facilitate organization of multiple single charging units and accessories.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
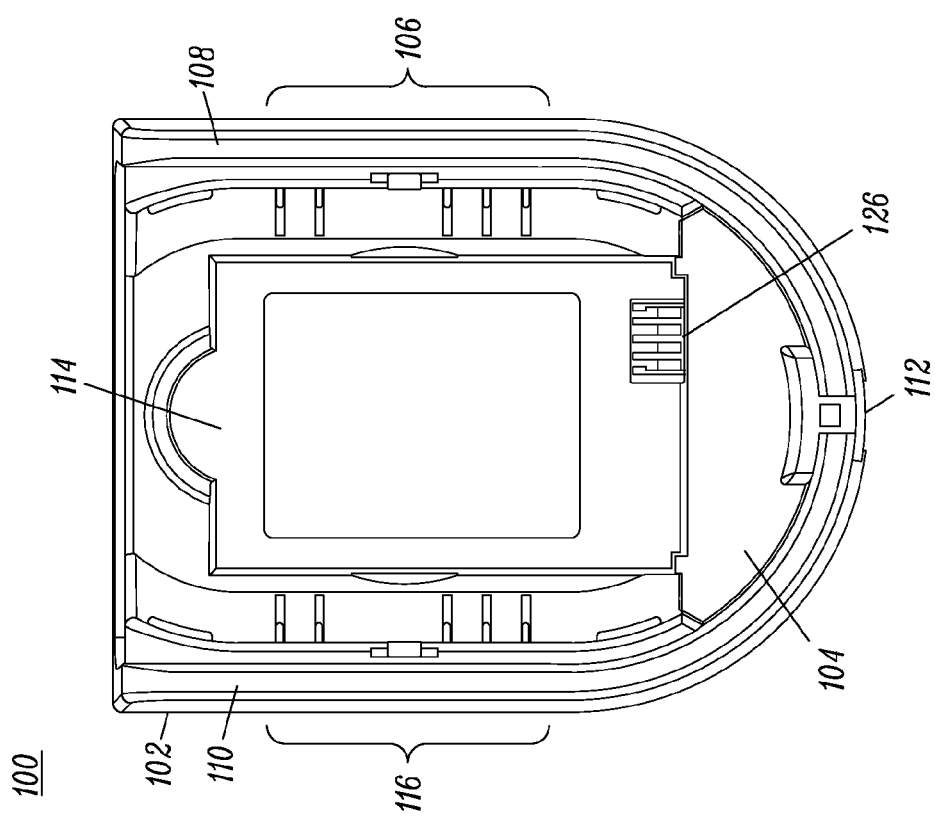
FIG. 1 is a charger formed in accordance with some embodiments.

FIG. 1 is a charger formed in accordance with some embodiments. Charger 100 is formed of a charger housing 102 having an open-faced pocket 104 formed therein for receiving a battery powered portable communication device (shown later). Open-faced pocket 104 is formed of two side walls 108, 110 (right and left), a bottom wall 112, and a back wall 114. Open-faced pocket 104 comprises two sets of symmetrically opposed charger contacts (right and left), referred to herein as first and second sets of charger contacts 106, 116. The first set of contacts 106 are coupled to first side wall 108, while the second set of contacts 116 are coupled to second side wall 110. The first set of contacts 106 may include, for example, power, temperature sensing, GND, and programming contacts. Likewise the second set of contacts 116 comprises the same contact configuration, mirror imaged on the opposing side wall 110. Fewer or additional contacts may be used depending on the application for the charger.

As an additional embodiment, the first and second set of charger contacts 106, 116 may be, but are not necessarily, spring loaded contacts which provide an additional retention means for retaining a portable communication device within pocket 104. Other types of charger contacts may also be used, such as, data or audio interfaces for real time applications or monitoring functions. As an additional embodiment, a separate set of charging contacts may be included within open-faced pocket 104 for charging a battery pack that has been removed from the battery powered portable communication device.

FIG. 2 shows the charger of FIG. 1 with a battery powered portable communication device 200 inserted therein in a face-up position in accordance with some embodiments. Battery powered portable communication device includes radio circuitry and a rechargeable battery (not shown) located within the device housing. The battery powered portable communication device 200 includes a plurality of battery contacts 206 which correspond, align and mate with the charger's first set of charger contacts 106 located on the first side wall 108 when the device is placed in a face-up position within the pocket 104. Battery contacts 206 are only required to be on one side of the portable communication device 200. The user interface configuration shown in FIG. 2 provides for face-up positioning of the battery powered portable communication device 200 within pocket 104.

Moving to FIG. 3, the charger 100 receives the battery powered portable communication device 200 in a face-down position in accordance with some embodiments. In this user interface configuration, the portable radio battery contacts 206 correspond, align and mate with the second set of charger contacts 116 located on the opposing side wall 110 of the open-faced pocket 104. The face-down user configuration allows for accessories 302, for example a belt clip, to remain attached to the back of battery powered portable communication device 200. The face-down configuration also accommodates a thicker battery being used in the portable communication device 200.

Figure 4:
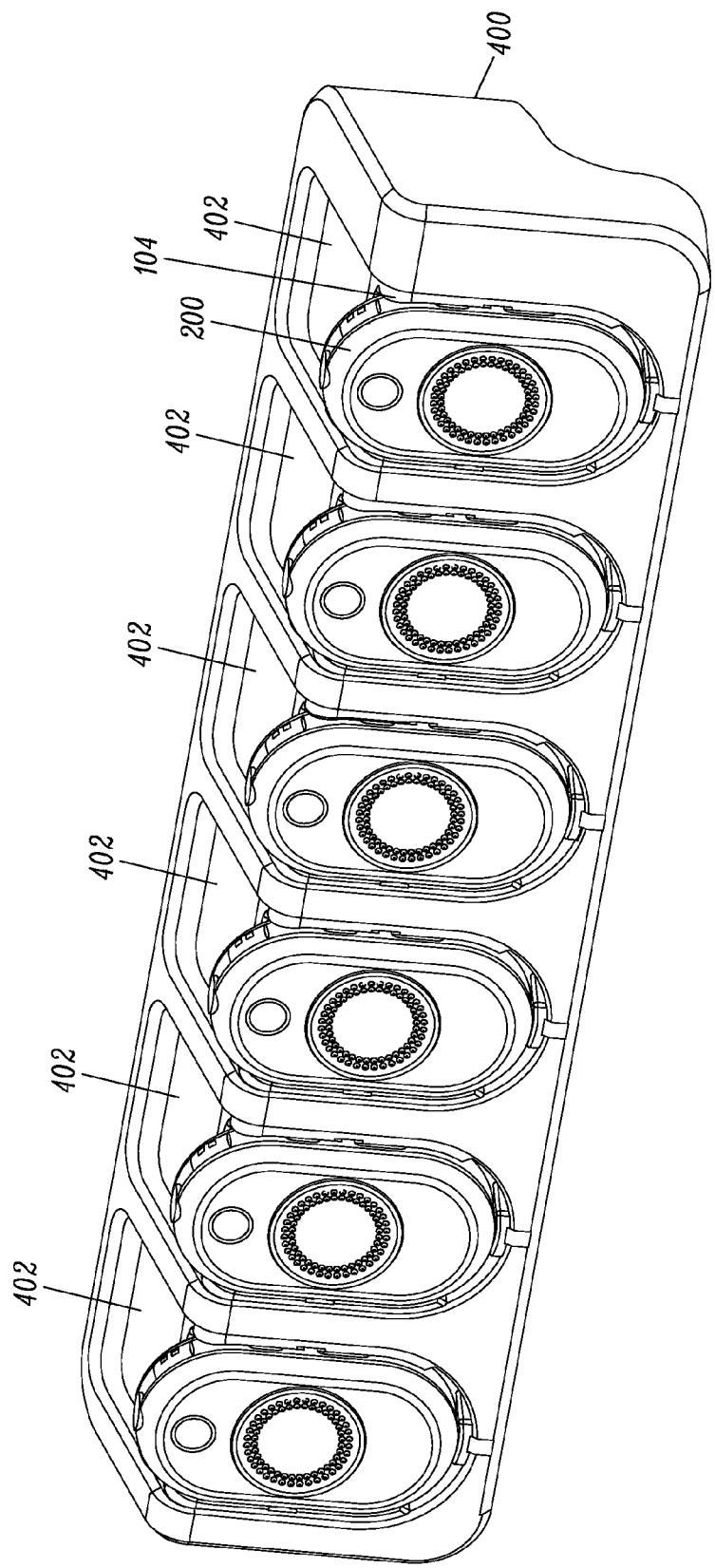
FIG. 4 is a multi-unit charger formed in accordance with some embodiments accommodating a plurality of battery powered communication devices in a face-up position.

The face-up and face-down user interface configurations shown and described in FIGS. 2 and 3 allow a user to select the configuration in accordance with their preference and how the device is being used. The user is no longer required to remove accessories prior to charging the portable communication device 200. The internal battery pack need not be removed for charging (unless desired) since face-down configuration accommodates a thicker battery operated portable communication device FIG. 4 is a multi-unit charger 400 formed in accordance with some embodiments accommodating a plurality of battery powered communication devices 200 in a face-up position. The multi-unit charger 400 includes a plurality of all of the interface elements described in the single-unit charger of FIG. 1 including open-faced pockets 104 for receiving the battery powered portable communication devices 200. Although not seen in this view, each open-faced pocket 104 is formed of two side walls 108, 110, a bottom wall 112, and a back wall 114 as was shown in FIG. 1. Each open-faced pocket 104 comprises two sets of symmetrically opposed charger contacts referred to as first and second sets of charger contacts 106, 116 coupled to first side wall 108 and second side wall 110 respectively. Additionally, the multi-unit charger 400 includes a plurality of accessory storage bins 402, one storage bin for each charger. An accessory coupled to the top of battery powered communication device 200 can be stored in storage bin 402 while the communication device is inserted within pocket 104 in the face-forward position. Loose or wireless accessories can also be stored in storage bins 402.

Figure 5:
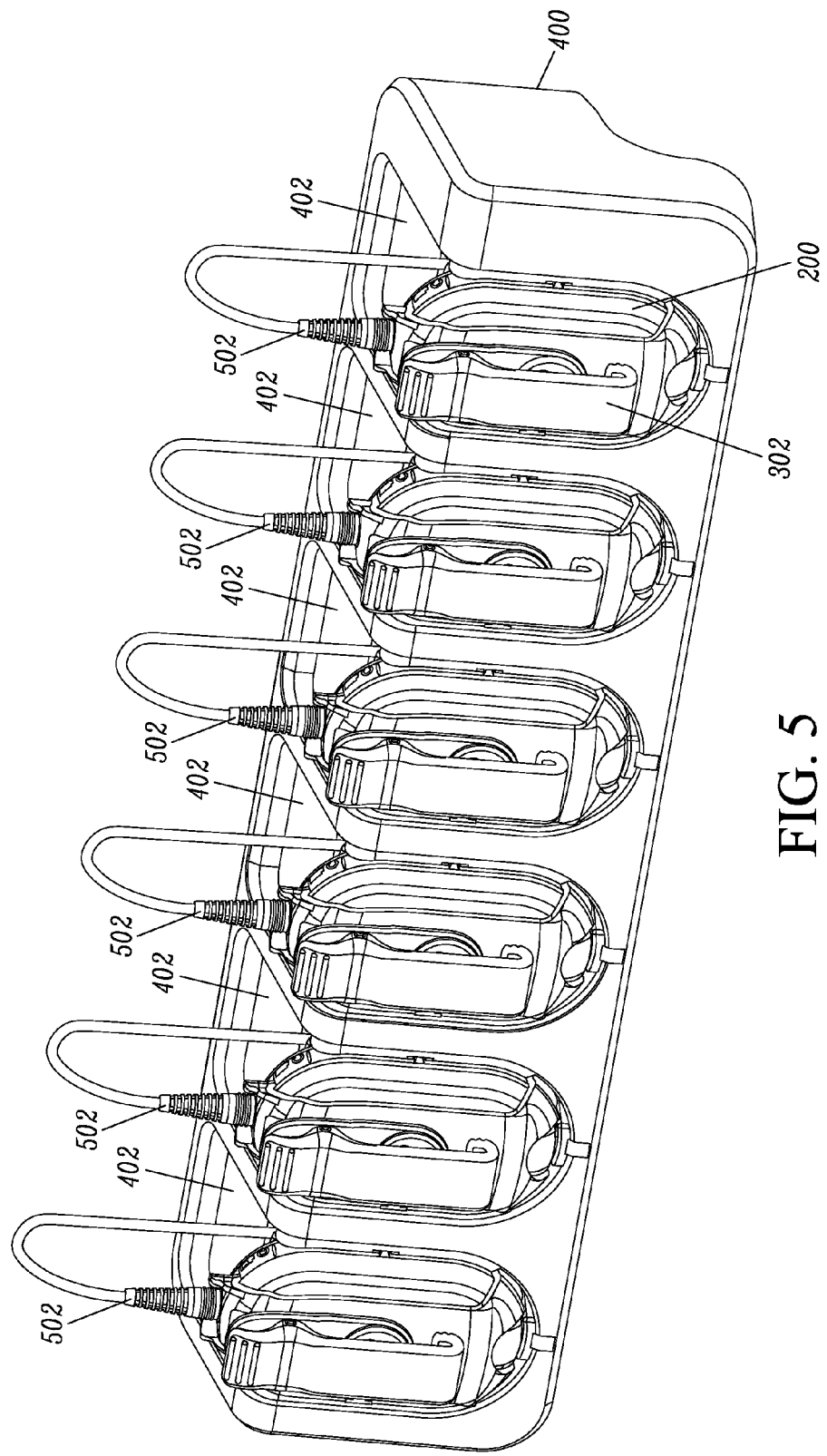
FIG. 5 is the multi-unit charger of FIG. 4 formed in accordance with some embodiments accommodating the plurality of battery powered communication devices in a face-down position with accessories attached thereto.

FIG. 5 is the multi-unit charger of FIG. 4 formed in accordance with some embodiments accommodating the plurality of battery powered communication devices 200 in a face-down position with a plurality of accessories 302, 502 attached thereto. Accessories, such as belt clips, no longer have to be removed when charging the battery powered portable communication devices 200. Additional corded accessories 502 can be stored within storage bins 402 while remaining attached to their respective devices if desired. Wireless accessories can also be stored in storage bins 402. The accessories 302, 502 can also be removed and stored within the storage bins 402 if desired. The ability to selectively charge the battery powered portable communication devices 200 in either a face-up or face-down position allows multiple users to sue the same charger device and still maintain organization and keep track of their own accessories without tangled or misplaced accessories. Although not shown the single-unit charger 100 may also include a storage bin.

The plurality of battery powered portable communication devices 200 may also be placed within the multi-unit charger 400 in a combination of face-up and face-down positions. A number of different users are thus able to use the multi-unit charger using the interface configuration of their choice while maintaining the accessories in an organized untangled manner.

Figure 6:
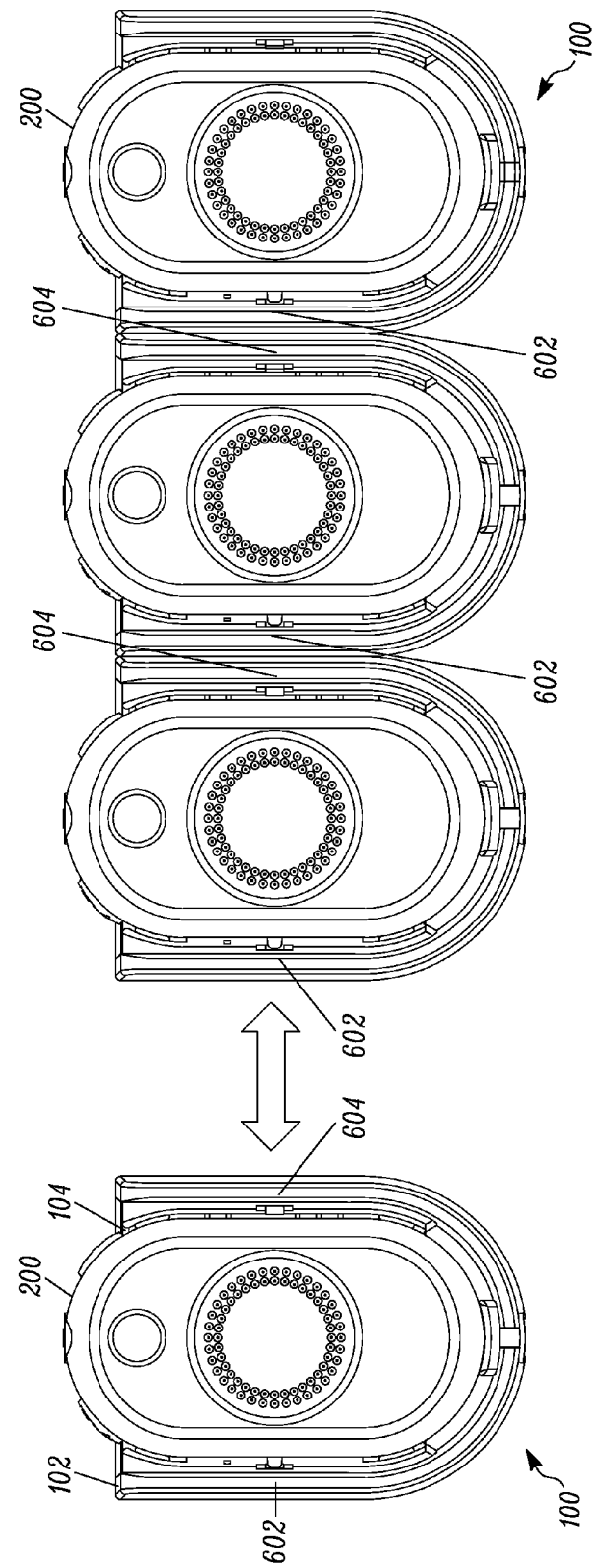
FIG. 6 is a plurality of magnetically coupled single-unit chargers formed in accordance with some embodiments.

FIG. 6 is a plurality of magnetically coupled single-unit chargers, such as single-unit charger 100, formed in accordance with some embodiments. The use of opposite polarity magnets 602, 604 placed in or on the charger housing 102 allows a plurality of single-unit chargers 100 to connect with each other and disconnect from each other without the use of screws, tape or additional assembly. The magnets are attracted to each other when placed in close proximity thus aligning and securing the chargers 100 in an orderly fashion. The use of magnets 602, 604 allows the user to easily connect and disconnect the chargers as needed based on usage and space. Incorporating magnets 602, 604 within the charger housing 102 provides a cost effective means to organize multiple single-unit chargers. Other single-unit chargers besides those described in conjunction with single-unit charger 100, can also benefit from magnetic coupling in order to optimize workspace. Coupling the single-unit chargers via magnetic coupling is an attractive solution for organizing a plurality of chargers to help reduce workspace clutter or when a multi-unit charger is not desired.

Accordingly, there has been provided drop-in charger which accommodates a battery operated portable communication device in both face-up and face-down positions in either a single-unit or multi-unit charger environment. The dual contact scheme allows for the user to select either the face-up or face-down configuration. The face-down configuration accommodates portable communication devices having accessories coupled thereto. The face-down confirmation accommodates portable radio housings of varying thickness (to accommodate larger battery packs within the radio). Additional storage bins have been configured within the charging systems to further improve organization of multiple accessories. Magnetic coupling has also been provided to facilitate organization of two or more single-unit chargers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A charger for a battery powered portable communication device, comprising:
   a housing; and
   a charger pocket formed within the housing for receiving the battery powered portable communication device, the charger pocket having first and second identically configured sets of two or more charger contacts symmetrically mirrored on opposing walls to accommodate and charge the battery powered portable communication device in a face-up and a face-down position via corresponding charging contacts of the battery powered portable communication device.

2. The charger of claim 1, wherein the first identically configured set of charger contacts charges the battery powered portable communication device in the face-up position, and the second identically configured set of charger contacts charges the battery powered portable communication device in the face-down position.

3. The charger of claim 1, wherein, when the battery powered portable communication device is placed within the charger pocket, only one set of the first and second identically configured sets of charger contacts provides charging to the battery powered portable communication device while both sets of charger contacts provide additional retention of the battery powered portable communication device within the charger pocket.

4. The charger of claim 2, further comprising:
   a storage bin coupled to the housing and separated from the charger pocket b a rear wall of the charger pocket, the storage bin having an upward-facing opening for receiving accessory devices attached to the battery powered portable communication device while the battery powered portable communication device is placed within the charger pocket.

5. The charger of claim 2, further comprising;
   a set of opposing polarity magnets disposed within the housing at outer laterally opposed surfaces of the charger for magnetically coupling and aligning the charger with other like chargers.

6. The charger of claim 2, wherein the charger comprises one of a single-unit charger and a multi-unit charger.

7. The charger of claim 1, wherein the face-down position accommodates one of a battery operated portable communication device having an accessory coupled to its back and a battery operated portable radio housing of varying thickness.

8. A charger, comprising:
   a housing having an open-faced charger pocket; and
   two identically configured sets of two or more symmetrically opposed charger contacts within the open-faced charger pocket, the two identically configured sets of symmetrically opposed charger contacts accommodating and charging a battery operated portable communication device in a face-up position and a face-down position via corresponding charging contacts of the battery operated portable communication device.

9. The charger of claim 8, wherein the charger comprises one of a single-unit charger and a multi-unit charger.

10. The charger of claim 8, wherein the face-down position accommodates one of a battery operated portable communication device having an accessory coupled to its back and a battery operated portable radio housing of varying thickness.

11. The charger of claim 10, wherein the face-down position accommodates the battery operated portable communication device having the accessory coupled to its back.

12. The charger of claim 10, wherein the face-down position accommodates the battery operated portable radio housing of varying thickness.

13. The charger of claim 8, further comprising a storage bin, separated from the charger pocket by a rear wall of the charger pocket, the storage bin having an upward-facing opening for storing accessories coupled to the battery operated portable communication device while the battery powered portable communication device is placed within the charger pocket.

14. The charger of claim 9, wherein the single-unit charger comprises a set of opposing polarity magnets disposed within the housing at outer laterally opposed surfaces of the single-unit charger for magnetically coupling aligning the single-unit charger with other like single-unit chargers.

15. A single-unit charger, comprising:
a housing having a set of opposing polarity magnets coupled thereto at outer laterally opposed surfaces of the single-unit charger, the set of magnets providing magnetic coupling and alignment to other similarly formed single-unit chargers.

16. The charger of claim 1, wherein each set of two or more charger contacts includes at least a power contact and a ground contact.

17. The charger of claim 16, wherein each set of two or more charger contacts further includes at least a temperature sensing contact and a programming contact.

18. The charger of claim 8, wherein each set of two or more charger contacts includes at least a power contact and a ground contact.

19. The charger of claim 18, wherein each set of two or more charger contacts further includes at least a temperature sensing contact and a programming contact.

\* \* \* \* \*